(12) United States Patent  
Dick

(10) Patent No.: US 8,837,633 B2  
(45) Date of Patent: Sep. 16, 2014

(54) SYSTEMS AND METHODS FOR DIGITAL PROCESSING BASED ON ACTIVE SIGNAL CHANNELS OF A COMMUNICATION SYSTEM

(75) Inventor: Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 273 days.

(21) Appl. No.: 13/279,209

(22) Filed: Oct. 21, 2011

(65) Prior Publication Data

US 2013/0101066 A1    Apr. 25, 2013

(51) Int. Cl.
- H04K 1/02 (2006.01)
- H04L 27/36 (2006.01)
- H04L 5/06 (2006.01)

(52) U.S. Cl.
CPC ............ H04L 5/06 (2013.01); H04L 27/368 (2013.01)
USPC ........... 375/296; 375/221; 375/278; 375/132; 330/149; 330/103; 330/107

(58) Field of Classification Search
USPC .................. 375/296, 295, 221, 278, 132
See application file for complete search history.

(56) References Cited

U.S. PATENT DOCUMENTS

| | | | |
|---|---|---|---|
| 5,299,230 A | 3/1994 | Jaeger et al. | |
| 5,530,920 A | 6/1996 | Takeda | |
| 5,867,065 A | 2/1999 | Leyendecker | |
| 6,252,912 B1 * | 6/2001 | Salinger | 375/278 |
| 6,275,685 B1 | 8/2001 | Wessel et al. | |
| 6,418,173 B1 | 7/2002 | Matsuoka et al. | |
| 6,477,388 B1 | 11/2002 | Schmutz | |
| 6,570,444 B2 | 5/2003 | Wright | |
| 6,587,514 B1 | 7/2003 | Wright et al. | |
| 6,714,073 B2 | 3/2004 | Suto et al. | |
| 6,741,662 B1 | 5/2004 | Francos et al. | |
| 6,751,447 B1 | 6/2004 | Jin et al. | |
| 6,794,936 B2 | 9/2004 | Hsu et al. | |
| 6,798,843 B1 | 9/2004 | Wright et al. | |

(Continued)

FOREIGN PATENT DOCUMENTS

| JP | 2001-284980 A | 10/2001 |
|---|---|---|
| JP | 2002-026665 A | 1/2002 |

(Continued)

OTHER PUBLICATIONS

Xilinx, Inc., J.83 Annex A/C Modulator v2.0, DS597, Product Brief, Jan. 16, 2007, pp. 1-6, Xilinx, Inc., 2100 Logic Drive, San Jose, CA USA.

(Continued)

*Primary Examiner* — Eva Puente  
(74) *Attorney, Agent, or Firm* — Chad Walsh

(57) ABSTRACT

A communication system includes digital signals that carry data and correspond to channels of a composite signal to be transmitted across a communication channel. Active channels are detected and used to configure digital processing. In one embodiment, active channels are detected, where a particular active channel corresponds to the presence of a particular one of the digital signals. Active channel detection may be used to configure pre-distortion of a composite signal to be transmitted to compensate for distortion in a digital-to-analog converter. Likewise, active channel detection may be used to optimize the configuration of an up-converter. In one embodiment, a programmable device is configured based on detected active channels into a plurality of different configurations.

20 Claims, 8 Drawing Sheets

(56) References Cited

U.S. PATENT DOCUMENTS

| | | | |
|---|---|---|---|
| 6,882,217 | B1 | 4/2005 | Mueller |
| 6,903,604 | B2 | 6/2005 | Kim |
| 6,928,272 | B2 | 8/2005 | Doi |
| 6,934,341 | B2 | 8/2005 | Sahlman |
| 6,998,909 | B1 | 2/2006 | Mauer |
| 7,012,969 | B2 | 3/2006 | Ode et al. |
| 7,020,447 | B2 | 3/2006 | Nagatani et al. |
| 7,058,369 | B1 | 6/2006 | Wright et al. |
| 7,085,330 | B1 | 8/2006 | Shirali |
| 7,113,036 | B2 | 9/2006 | Moffatt et al. |
| 7,113,037 | B2 | 9/2006 | Nezami |
| 7,151,405 | B2 * | 12/2006 | Nezami .......... 330/149 |
| 7,177,603 | B1 | 2/2007 | Wright et al. |
| 7,203,247 | B2 | 4/2007 | Bauder et al. |
| 7,260,365 | B1 | 8/2007 | Wright et al. |
| 7,269,231 | B2 | 9/2007 | Ding et al. |
| 7,333,562 | B2 | 2/2008 | Iwasaki |
| 7,336,716 | B2 | 2/2008 | Maltsev et al. |
| 7,348,844 | B2 | 3/2008 | Jaenecke |
| 7,372,918 | B2 | 5/2008 | Muller et al. |
| 7,412,469 | B2 | 8/2008 | Dalipi |
| 7,511,574 | B2 | 3/2009 | Hongo |
| 7,514,996 | B2 | 4/2009 | Furuta et al. |
| 7,729,446 | B2 | 6/2010 | Copeland |
| 7,737,779 | B2 | 6/2010 | Summerfield et al. |
| 7,741,906 | B1 | 6/2010 | Summerfield |
| 7,746,167 | B1 | 6/2010 | Summerfield |
| 7,856,048 | B1 * | 12/2010 | Smaini et al. .......... 375/221 |
| 7,929,927 | B2 | 4/2011 | Norris et al. |
| 7,944,295 | B2 | 5/2011 | Hongo et al. |
| 8,229,025 | B1 | 7/2012 | Summerfield |
| 8,243,852 | B1 | 8/2012 | Summerfield |
| 8,285,770 | B1 | 10/2012 | Barnes et al. |
| 8,737,523 | B2 | 5/2014 | Barnes |
| 2001/0007435 | A1 | 7/2001 | Ode et al. |
| 2001/0036152 | A1 | 11/2001 | Butash |
| 2002/0064236 | A1 | 5/2002 | Matsuoka et al. |
| 2003/0063686 | A1 | 4/2003 | Giardina et al. |
| 2003/0076894 | A1 * | 4/2003 | Jin et al. .......... 375/296 |
| 2003/0104792 | A1 | 6/2003 | Doi |
| 2004/0142667 | A1 | 7/2004 | Lochhead et al. |
| 2005/0231279 | A1 | 10/2005 | Moffatt et al. |
| 2006/0008028 | A1 | 1/2006 | Maltsev et al. |
| 2006/0012426 | A1 | 1/2006 | Nezami |
| 2006/0164170 | A1 | 7/2006 | Brokaw |
| 2008/0157819 | A1 | 7/2008 | Bhandari et al. |
| 2008/0157869 | A1 | 7/2008 | Bhandari et al. |
| 2008/0157870 | A1 | 7/2008 | Bhandari et al. |
| 2009/0041088 | A1 * | 2/2009 | Yang et al. .......... 375/132 |
| 2009/0251195 | A1 * | 10/2009 | Ahmed et al. .......... 327/334 |
| 2009/0256630 | A1 | 10/2009 | Brobston |
| 2010/0117729 | A1 | 5/2010 | Shako et al. |
| 2010/0220810 | A1 * | 9/2010 | Jin et al. .......... 375/296 |
| 2010/0308910 | A1 | 12/2010 | Barnes |
| 2011/0064171 | A1 | 3/2011 | Huang et al. |

FOREIGN PATENT DOCUMENTS

| | | |
|---|---|---|
| JP | 2004-312344 A | 11/2004 |
| JP | 2005-203925 A | 7/2005 |
| WO | WO 00/76115 A1 | 12/2000 |
| WO | WO 2007-046370 A1 | 4/2007 |

OTHER PUBLICATIONS

Xilinx, Inc., J.83 Annex A/C Modulator v2.0, DS296, Product Specification, Jan. 16, 2007, pp. 1-47, Xilinx, Inc., 2100 Logic Drive, San Jose, CA USA.

Xilinx, Inc., J.83 Annex B Modulator v2.0, DS269, Product Brief, Jan. 16, 2007, pp. 1-6, Xilinx, Inc., 2100 Logic Drive, San Jose, CA USA.

Xilinx, Inc., J.83 Annex B Modulator v2.0, DS285, Product Specification, Jan. 16, 2007, pp. 1-56, Xilinx, Inc., 2100 Logic Drive, San Jose, CA USA.

U.S. Appl. No. 12/201,633, filed Aug. 29, 2008, Summerfield, Xilinx, Inc., 2100 Logic Drive, San Jose, CA 95124 USA.

U.S. Appl. No. 12/201,718, filed Aug. 29, 2008, Barnes et al., Xilinx, Inc., 2100 Logic Drive, San Jose, CA 95124 USA.

Altera Corporation, "Digital Predistortion Reference Design," pp. 1-2, available at URL: http://www.altera.com/support/refdesigns/sys-sol/wireless/ref-dig-predis.html or from Altera Corporation, 101 Innovation Drive, San Jose, California 95134, Jul. 2003.

Zhang, Zhengya, et al., Peak-to-Average Power Ratio Reduction in an FDM Broadcast System, signal Processing Systems, 2007 IEEE Workshop on IEEE, PI (SiPS 2007), Oct. 1, 2007, pp. 25-30.

Altera Corporation, "Digital Predistortion," pp. 1-4, available at URL: http://www.altera.com/end-markets/wireless/advanced-dsp/predistortion/wir-digital-predistortion.html or from Altera Corporation, 101 Innovation Drive, San Jose, California 95134, 2008.

Altera Corporation, "Digital Predistortion Reference Design," Application Note AN-314-1.0, Jul. 2003, pp. 1-46, available from Altera Corporation, 101 Innovation Drive, San Jose, California 95134.

Ding, Lei et al., "A Hammerstein Predistortion Linearization Design Based on the Indirect Learning Architecture," *Proc. of the 2002 IEEE International Conference on Acoustics, Speech & Signal Processing*, May 13, 2002, pp. III-2689-III-2692, vol. 3, IEEE., Piscataway, New Jersey, USA.

Gilabert, Pere L. et al., "Multi-Lookup Table FPGA Implementation of an Adaptive Digital Predistorter for Linearizing RF Power Amplifiers With Memory Effects" *IEEE Transactions on Microwave Theory and Techniques*, Feb. 1, 2008, pp. 372-384, vol. 56, No. 2, IEEE, Piscataway, New Jersey, USA.

Kwan, Andrew et al., "Automating the Verification of SDR Baseband Signal Processing Algorithms Developed on DSP/FPGA Platform," *Proc. of the 2006 IEEE Workshop on Signal Processing Systems Design and Implementation*, Oct. 1, 2006, pp. 5-9, IEEE, Piscataway, New Jersey, USA.

* cited by examiner

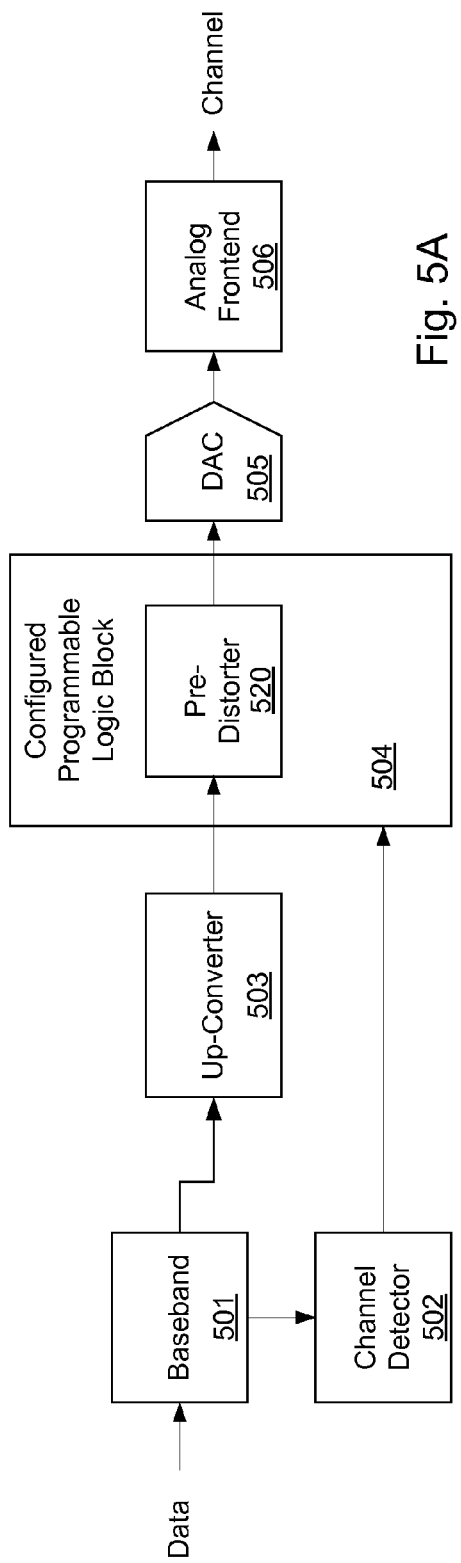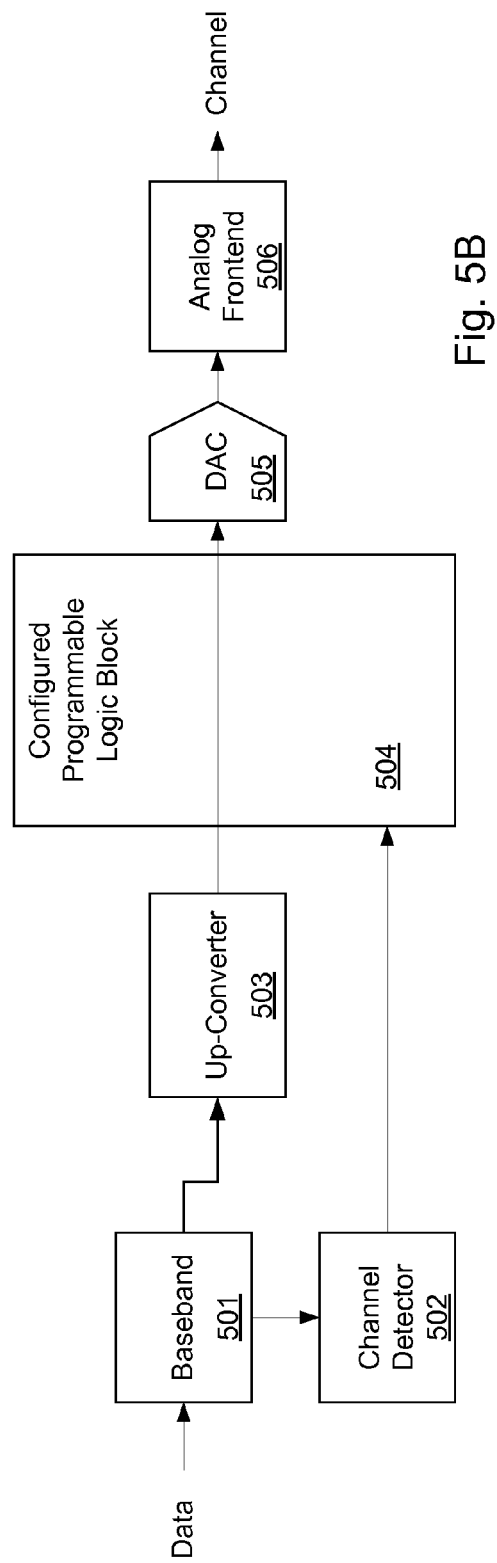

SYSTEMS AND METHODS FOR DIGITAL PROCESSING BASED ON ACTIVE SIGNAL CHANNELS OF A COMMUNICATION SYSTEM

FIELD OF THE INVENTION

An embodiment relates to integrated circuit devices (ICs). More particularly, an embodiment relates to a systems and methods of digital processing based on active signal channels in a communication system.

BACKGROUND

Communication systems are used to deliver information. Communication systems may be used to send information (e.g., data) from one electronic system to another electronic system. The sending electronic system typically includes a transmitter for processing data for transmission across a communication channel. The receiving electronic system includes a receiver for processing signals received across the communication channel. Typically, data is generated by the sending electronic system and forwarded to the transmitter, and the transmitter processes the data for transmission across the channel. Similarly, the receiver processes the received signal and forwards the data to the receiving electronic system.

Transmitters often include baseband circuits that receive data and perform data processing on the data to prepare the data for transmission. The processing may include encoding the data into one or more digital signals, such as a quadrature amplitude modulation ("QAM") signal, for example. Baseband processing is typically limited to processing digital signals that are centered on zero frequency. In some applications, the digital signals are then up-converted to higher frequencies by an up-converter to create a composite signal. Multiple digital signals may be up-converted to multiple different frequencies. The combined signals form the composite signal to be transmitted across the communication channel, and the up-converted digital signals correspond to channels of a composite signal.

After up-conversion, the digital signals may be converted to analog signals using a digital-to-analog converter. Finally, an analog frontend typically drives the analog signals onto the communication channel. The analog front end may include analog amplifiers and other circuits tailored to condition the analog signal for transmission onto a particular communication channel. Example communication channels include cables (e.g., coaxial cables), optical fibers, twisted pairs, and the air (e.g., for RF transmission).

One problem with some transmitters occurs when the composite signal is converted from digital to analog by a digital to analog converter ("DAC"). Circuitry in the DAC may distort the composite signal as the digital signal is converted to an analog signal. Distortion may result in unwanted spectral artifacts at particular frequencies. For example, in a cable transmitter application, distortion from a DAC may cause an unwanted frequency component at (fs/2)−2fo, where fs is the sample frequency and fo is the center frequency. Such distortion is generally undesirable, and in some cases such distortion can cause the system to fail compliance testing.

More generally, as the number of channels increases in communication systems, additional circuits are required to process the digital signals. Such additional circuits result in an undesirable increase in power consumption. Furthermore, additional circuits occupy more space on an integrated circuit and increase the cost of the system.

SUMMARY

In one embodiment, a method comprises receiving one or more digital signals. Each of the digital signals carry data and each of the digital signals are constrained within a first frequency range. The digital signals correspond to one or more channels of a composite signal to be transmitted across a communication channel. The method further includes detecting active channels, where a particular active channel corresponds to the presence of a particular one of the digital signals. A programmable device is configured based on the detected active channels into a plurality of different configurations, where different configurations perform different digital processing operations on the digital signals.

In one embodiment, the programmable device is configured into a first configuration comprising a pre-distorter when a number of detected active channels is less than a first value, and the programmable device is otherwise configured into at least one other configuration that does not include the pre-distorter.

In one embodiment, the method further comprises, in the first configuration, receiving the composite signal comprising the digital signals arranged across a frequency range at an input of the pre-distorter, and pre-distorting the composite signal, wherein the pre-distorting compensates, at least in part, for distortion caused by an digital-to-analog converter to produce a pre-distorted composite signal.

In one embodiment, the method further comprises coupling the pre-distorted composite signal to a single digital-to-analog converter.

In one embodiment, the programmable device is configured into the first configuration comprising the pre-distorter when the number of active channels cause an unwanted frequency component produced by a digital-to-analog converter to increase above a predetermined threshold.

In one embodiment, configuring the programmable device based on the detected active channels comprises configuring the programmable device with a first digital up-converter configuration when a first number of active channels is detected, and configuring the programmable device with a second digital up-converter configuration when a second number of active channels is detected.

In one embodiment, the first number of active channels is greater than the second number of active channels, and wherein the first digital up-converter configuration comprises more resources on the programmable device than the second digital up-converter configuration.

In one embodiment, configuring the programmable device comprises partially reconfiguring the programmable device dynamically based on the detected active channels.

In another embodiment, a method comprises receiving a composite signal to be transmitted across a communication channel, the composite signal comprising one or more digital signals that carry data, wherein the digital signals occupy different frequencies of the composite signal and the digital signals are each constrained within a first frequency range at the different frequencies, and wherein the one or more digital signals correspond to one or more channels of the composite signal, detecting active channels, wherein a particular active channel corresponds to the presence of a particular one of the digital signals, and selectively pre-distorting the composite signal based on the detected active channels, wherein pre-distorting the composite signal occurs when a number of the active channels is below a first value, and when the number of active channels is not below the first value the composite signal is not pre-distorted.

In one embodiment, the active channels are all below a first frequency.

In one embodiment, selectively pre-distorting comprises configuring a signal path in response to digital control signals, wherein the signal path comprises one of (a) routing the composite signal from an input path to an input of a pre-distorter and routing an output of the pre-distorter to an output path and (b) routing the input path around the pre-distorter to the output path.

In one embodiment, selectively pre-distorting comprises configuring a programmable device into a plurality of different configurations based on the detected active channels, wherein in a first configuration the programmable device pre-distorts the composite signal and in a second configuration the programmable device does not pre-distort the composite signal.

In one embodiment, the method further comprises, after the selectively pre-distorting the composite signal, converting the composite signal from a digital signal to an analog signal.

In one embodiment, said pre-distorting compensates, at least in part, for distortion caused by the act of converting the composite signal from the digital signal to the analog signal.

In one embodiment, a circuit comprises a baseband digital circuit, the baseband digital circuit outputting one or more digital signals, wherein each of the digital signals carry data and each of the digital signals are constrained within a first frequency range, and wherein the one or more digital signals correspond to one or more channels of a composite signal to be transmitted across a communication channel, a channel detector to detect active channels, wherein a particular active channel corresponds to the presence of a particular one of the digital signals, and a programmable block configured based on the detected active channels, wherein the programmable block is configured into a plurality of different configurations to perform different digital processing operations on the one or more digital signals.

In one embodiment, when a number of detected active channels is less than a first value the programmable block is configured into a first configuration comprising a pre-distorter, wherein the pre-distorter compensates, at least in part, for distortion caused by an digital-to-analog converter, and wherein the programmable block is otherwise configured into at least one other configuration that does not include the pre-distorter.

In one embodiment, the circuit further comprises a single digital-to-analog converter, wherein when the programmable block is in the first configuration, an input of the single digital-to-analog converter is coupled to an output of the pre-distorter.

In one embodiment, the programmable block further comprises a first configuration when a first number of active channels is detected, the first configuration comprising a first digital up-converter to up-convert the first number of active channels, and a second configuration when a second number of active channels is detected, the second configuration comprising a second digital up-converter to up-convert the second number of active channels.

In one embodiment, the first number of active channels is greater than the second number of active channels, and wherein the first digital up-converter comprises more resources on the programmable block than the second digital up-converter.

In one embodiment, the programmable block is partially reconfigured dynamically based on the detected active channels.

The following detailed description and accompanying drawings provide a better understanding of the nature and advantages of the present invention.

BRIEF DESCRIPTION OF THE DRAWINGS

FIGS. 5A-B illustrate alternative configurations for another transmitter that selectively pre-distorts the composite signal based on the detected active channels.

DETAILED DESCRIPTION

Figure 1:
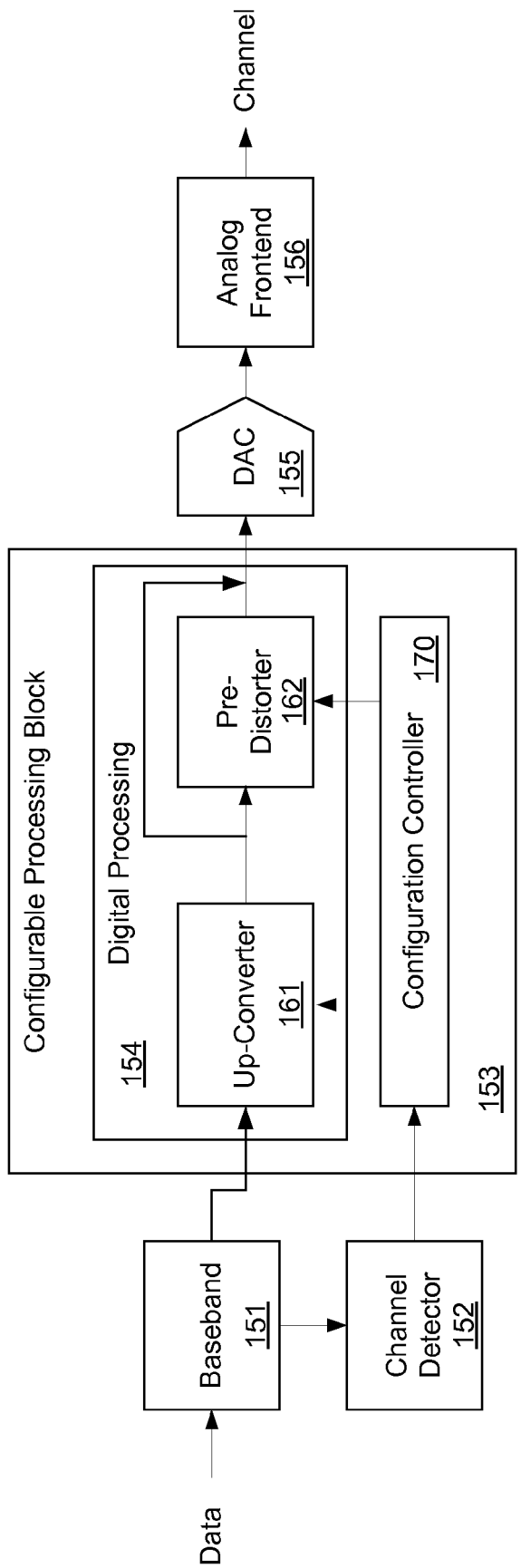
FIG. 1 illustrates processing signals based on active channels in a communication system according to one embodiment.
Figure 2A:
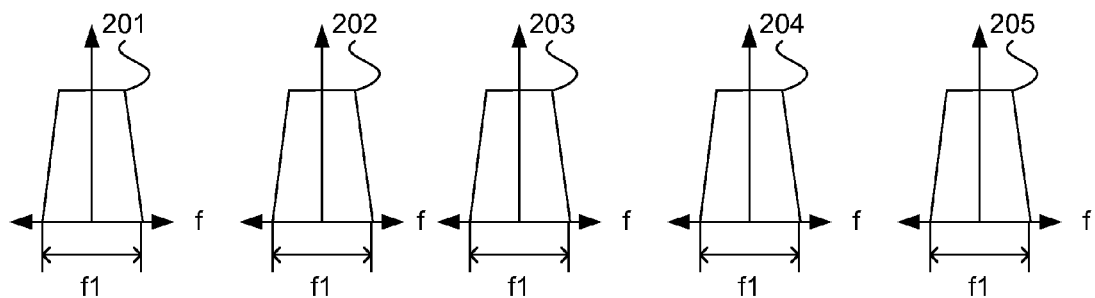
FIGS. 2A-B illustrates digital signals and a composite signal according to one embodiment.
Figure 2B:
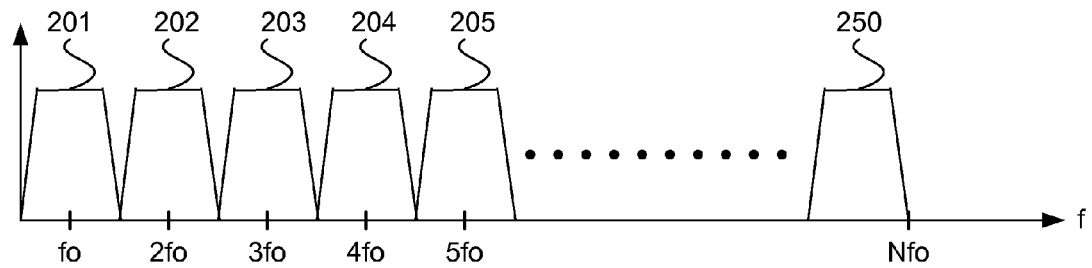

FIG. 1 illustrates processing signals based on active channels in a communication system according to one embodiment. Data is received by a baseband circuit 151. Baseband circuit 151 may encode the data into one or more digital signals. As mention above, the data may be encoded into QAM digital signals, which may be used in an EdgeQAM cable modem termination service (CMTS) system, for example. FIG. 2A illustrates individual digital signals 201-205. As mentioned above, the digital signals correspond to one or more channels of a composite signal to be transmitted across a communication channel. Each of the digital signals carries some portion of the data received by the baseband circuit 151. As illustrated in FIG. 2A, each of the digital signals is constrained within a frequency range, f1. For example, in a cable transmission system, each digital signal may have a bandwidth of approximately 6 MHz. FIG. 2B illustrates a composite signal, where the individual digital signals 201-205 occupy different frequencies of the composite signal. When the composite signal is transmitted, a receiver may access data in each of the different digital signals by decoding different channels of the composite signal, for example. However, in different applications, not all of the channels are used to transmit data. In other words, some applications may only transmit a subset of all the possible channels the transmitter is able to produce. Thus, the composite signal may include active channels that each contain one of the digital signals and inactive (e.g., empty) channels that contain no information.

In one embodiment, active channels may be detected and used to configure the circuit to change the digital processing applied by the system. A particular active channel corresponds to the presence of a particular one of the digital signals. A channel having a particular frequency in the composite signal may be inactive if there is no corresponding digital signal arranged at the particular frequency, for example. Referring again to the illustrative example in FIG. 1, a channel detector 152 detects active channels and may provide signals to a configuration controller 170. Configuration controller 170 may change the configuration of configurable processing block 153 to change the digital processing 154 applied to the digital signals. In one embodiment described in more detail below, configurable processing block is a programmable block (such as, e.g., a programmable logic block) of a programmable device (such as, e.g., a programmable logic device). Some embodiments include configuring a programmable logic device based on the detected active channels into a plurality of different configurations. The different configurations perform different digital processing operations on the digital signals to produce a composite signal.

FIG. 1 shows two (2) example digital processing functions that may be modified based on active channel detection. One example is up-conversion, and the other example is pre-distortion. As described in further examples below, it may be desirable to change the configuration of an up-converter 161 so that not all channels are up-converted. For example, a system may be capable of transmitting a certain number of channels, but not all the channels may be active in a particular application. In this case, up-converter 161 may be configured to up-convert a subset of the total number of channels. Similarly, whether or not pre-distortion is required may depend on the number of active channels. For example, the composite signal, which includes the individual up-converted digital signals, is converted from digital to analog by DAC 155. As described in the examples below, changes in the number of active channels may impact the amount of distortion produced by DAC 155. Distortion from DAC 155 may cause unwanted spectral artifacts that are driven onto the channel by analog frontend 156. Therefore, in some cases it may be desirable to configure the circuit to include a pre-distorter 162 to reduce or eliminate the unwanted spectral artifacts, while in other cases it may be desirable to eliminate the pre-distorter 162 from the system to reduce utilized resources.

While the channel detector 152 is illustrated here as a separate block from the baseband circuit 151, it is to be understood that the channel detectors of the present disclosure may be included as part of the baseband circuit to detect the individual digital signals, for example. The baseband circuit 151 and the channel detector 152 can be implemented in silicon or implemented in software that executes on a processor. Similarly, while channel detector 152 is illustrated as being directly connected to configuration controller 170, it is to be understood that a variety of intermediate circuits could be arranged between channel detector 152 and configuration controller 170 to control the configuration process. FIG. 1 is therefore to be taken as illustrative.

Figure 3A:
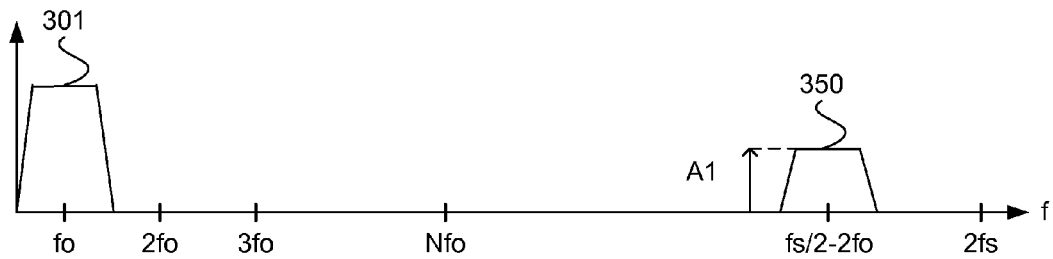
FIG. 3A-C illustrates the relation between the composite signal and an unwanted spectral artifact.
Figure 3B:
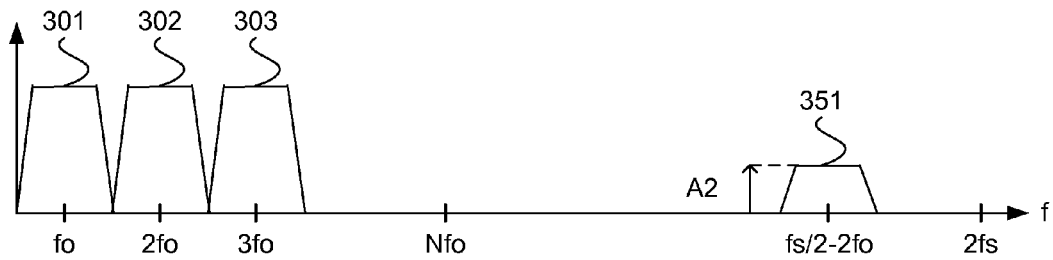
Figure 3C:
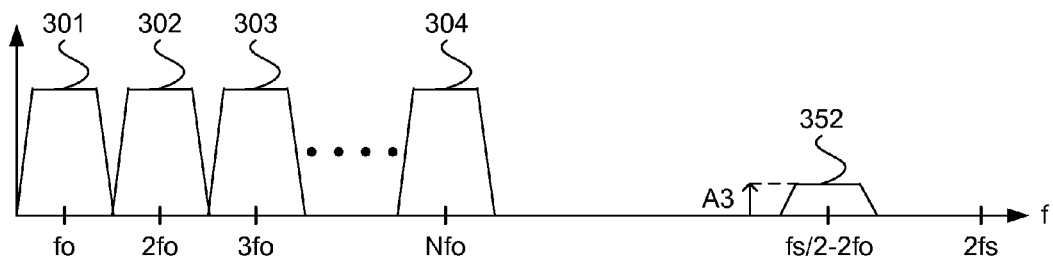

Some embodiments may reduce unwanted spectral artifacts generated when the composite signal is converted from the digital domain to the analog domain. FIG. 3A-C illustrates the relation between the composite signal and an unwanted spectral artifact. As illustrated in FIG. 3A, if the composite signal contains only one active channel 301, distortion in the conversion process results in an unwanted frequency component 350 at (fs/2)–2fo having an magnitude A1. However, as the number of active channels in the composite signal increase, the magnitude of the unwanted component decreases. FIG. 3B shows a composite signal having three active channels. In this case, the magnitude of an unwanted frequency component 351 has decreased to A2. Similarly, FIG. 3C shows a composite signal having N active channels, wherein N is an integer equal to the total number of channels. In this case, the magnitude of an unwanted frequency component 352 has decreased to A3. Accordingly, as the number of channels increases, the magnitude of the unwanted frequency component decreases. In other words, the magnitude of the unwanted frequency component increases as the number of channels decreases. Therefore, some embodiments may reduce unwanted frequency components by pre-distorting the composite signal based on the active channels (e.g., when the number of active channels is below some number).

Figure 4:
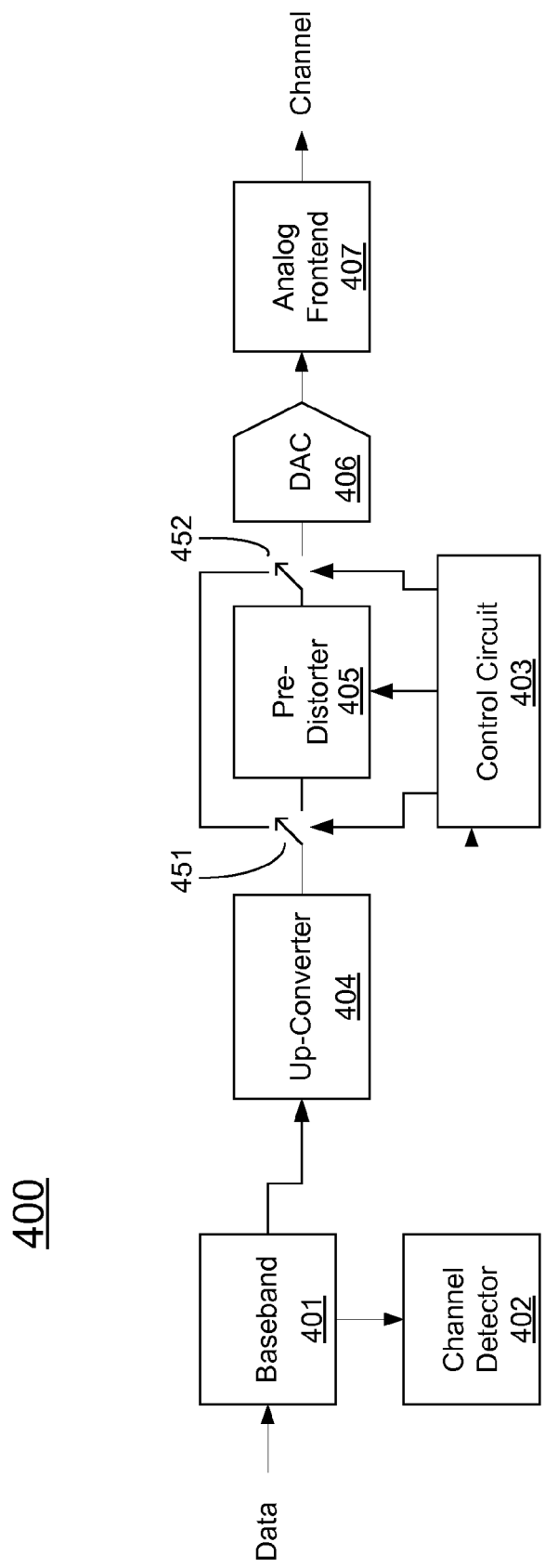
FIG. 4 illustrates a transmitter that selectively pre-distorts the composite signal based on the detected active channels.

FIG. 4 illustrates a transmitter 400 that selectively pre-distorts the composite signal based on the detected active channels. In this example, transmitter 400 includes a baseband circuit 401, channel detector 402, control circuit 403, up-converter 404, pre-distorter 405, switches 451-452, DAC 406 and analog frontend 407. In one embodiment, transmitter 400 detects active channels and selectively pre-distorts the composite signal based on the detected active channels. Pre-distorting the composite signal compensates, at least in part, for distortion caused by DAC 406. In particular, channel detector 402 detects active channels. When a number of active channels is below a particular value, then the composite signal is pre-distorted, and when the number of active channels is not below the particular value, the composite signal is not pre-distorted. In this example, channel detector 402 is coupled to control circuit 403. Based on the number of active channels, control circuit 403 may receive signals to route the composite signal through the pre-distorter or around the pre-distorter. For instance, a signal path may be configured in response to digital control signals from control circuit 403 by opening and closing switches illustrated at 451 and 452. When a number of active channels is below a particular value, the signal path may route the composite signal from an input path (e.g., the output of the up-converter) to an input of pre-distorter 405, and route an output of pre-distorter 405 to an output path (e.g., an input of DAC 406). In this case, a connection between an output of up-converter 404 and the input of pre-distorter 405 is established though switch 451 and a connection between an output of pre-distorter 405 and an input of DAC 406 is established through switch 452. In this configuration, control signals may also power down pre-distorter 405. When a number of active channels is above a particular value, the signal path may route the composite signal around pre-distorter 405 to the output path. In this case, a connection between an output of up-converter 404 and the input of DAC 406 is established through switches 451 and 452.

FIGS. 5A-B illustrate alternative configurations for another transmitter that selectively pre-distorts the composite signal based on the detected active channels. In this example, the transmitter includes a baseband circuit 501, channel detector 502, up-converter 503, programmable logic block 504, DAC 505 and analog frontend 506. In this example, the transmitter detects active channels and selectively pre-distorts the composite signal based on the detected active channels by configuring programmable logic block 504 of a programmable logic device. In particular, channel detector 502 detects active channels. As illustrated in FIG. 5A, when a number of active channels is less than a particular value, then programmable logic block 504 is configured to include pre-distorter 520. In this configuration, the pre-distorter receives the composite signal, pre-distorts the composite signal, and produces a pre-distorted composite signal. Programmable logic block 504 may be configured to include a pre-distorter when the number of active channels causes an unwanted frequency component produced by a digital-to-analog converter to increase above a predetermined threshold, for example. Pre-distorter 520 reduces the unwanted frequency component by cancelling out the distortion from DAC 505. In some applications, a composite signal having less than eight (8) channels may result in DAC 505 producing an unacceptably high spectral artifact. Accordingly, when less than eight (8) channels are detected, a programmable logic device may receive configuration data to configure the device to include a pre-distorter. As illustrated in FIG. 5B, when the number of active channels is not less than the particular value (e.g., 8 channels), then programmable logic block 504 is configured to couple the composite signal at the output of up-converter 503 to the input of DAC 505.

In some embodiments, the DAC used to perform the digital-to-analog conversion may be a single DAC. In some cases, the single DAC may have a particular distortion characteristic. Accordingly, pre-distorters according to some embodiments are configured to compensate for the particular distortion characteristics of a single DAC.

Figure 6A:
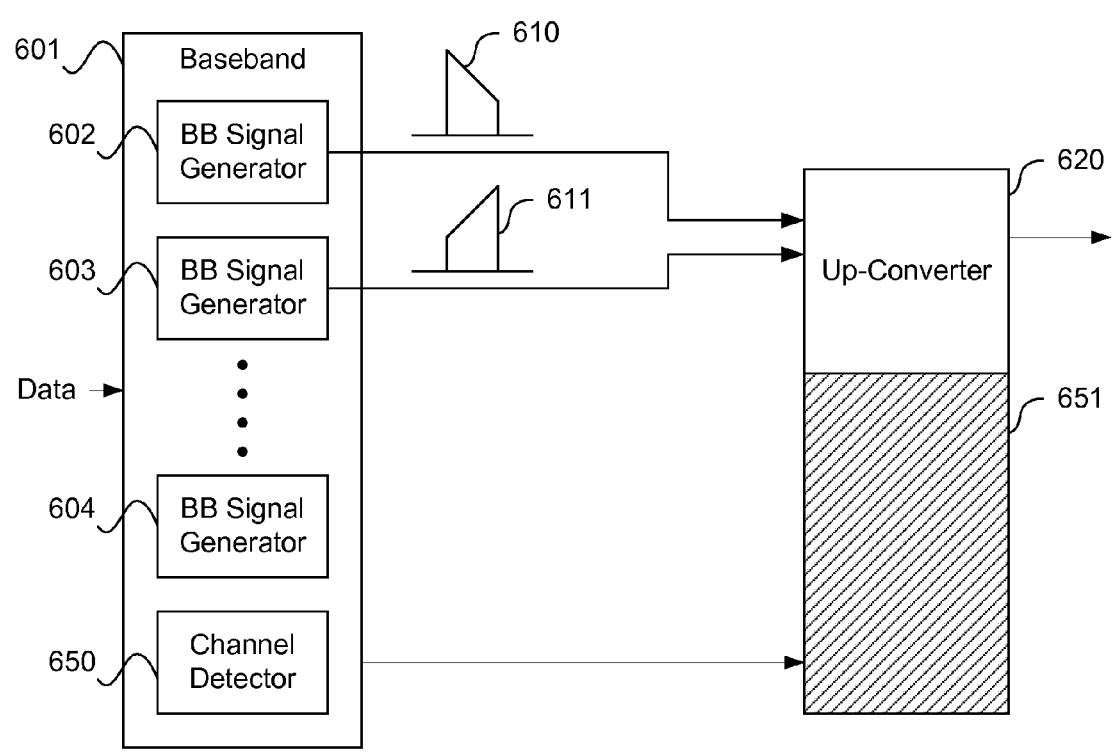
FIGS. 6A-C illustrate another example of digital processing functions that may be modified based on active channel detection.
Figure 6B:
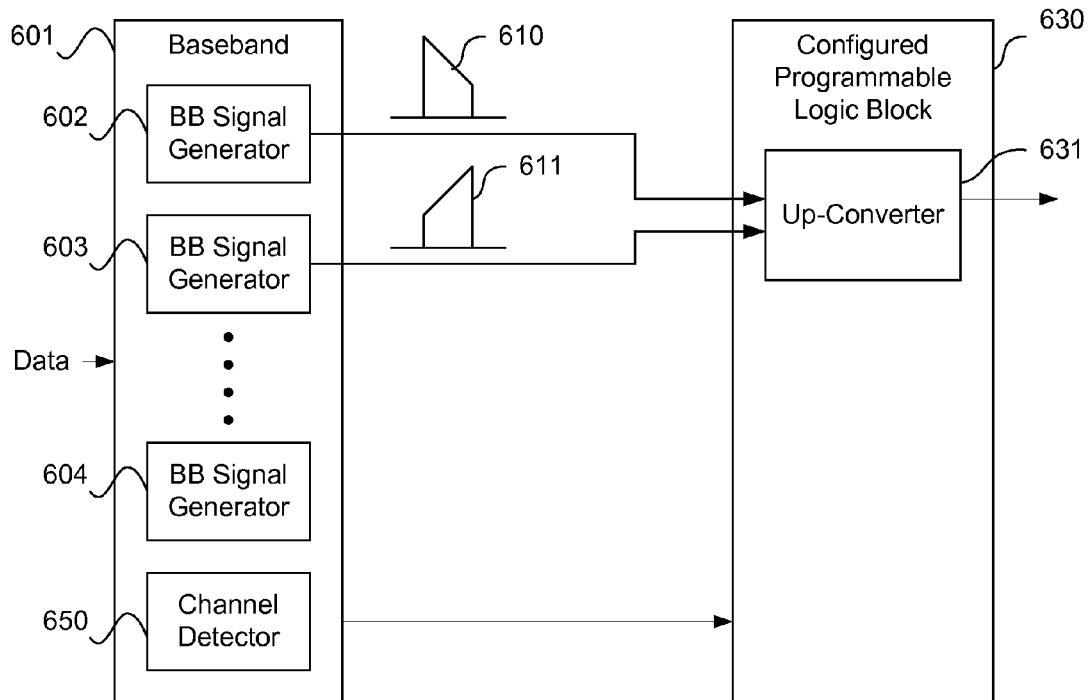
Figure 6C:
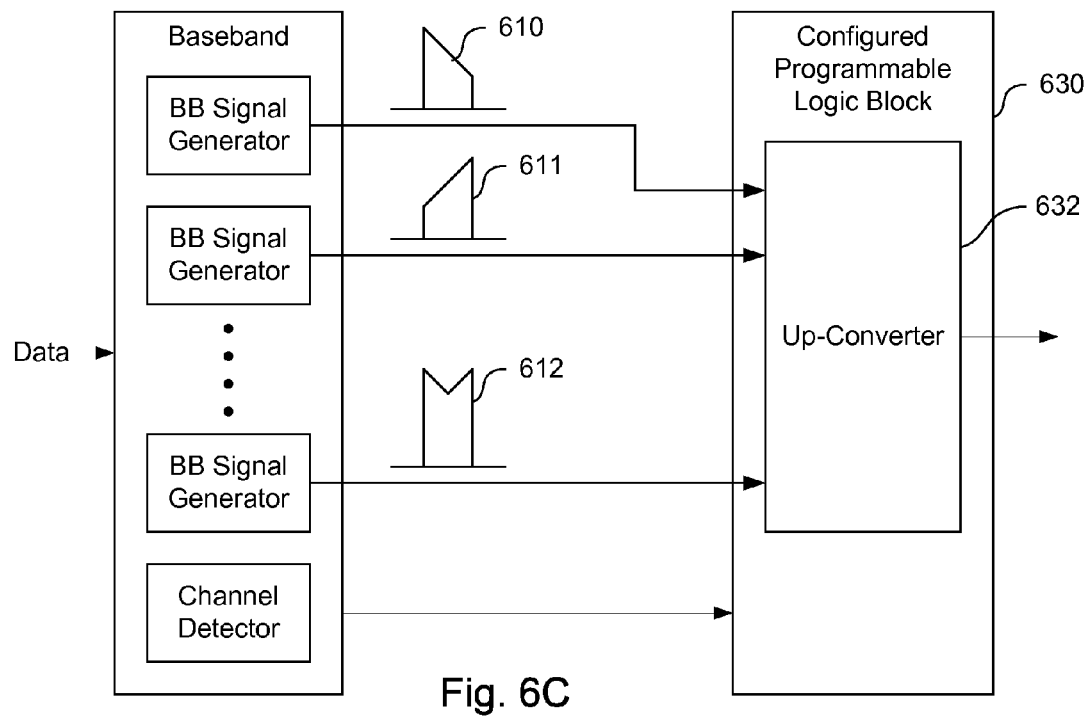

FIGS. 6A-C illustrate another example of digital processing functions that may be modified based on active channel detection. Here, a digital up-converter 620 is modified based on the active channels in the system. For example, in FIG. 6A, baseband circuit 601 receives data, and the data is processed in multiple different paths. Particular data may be designated for particular channels of the composite signal. Accordingly, different data is processed by different baseband signal generators ("BB Signal Generator") 602-604. As shown in FIG. 6A, signal generator 602 generates digital signal 610 and signal generator 603 generates digital signal 611. In this example, the baseband circuit 601 only outputs two (2) digital signals. Accordingly, only two (2) digital signals are to be up-converted to the composite signal. Channel detector 650 detects the active channels (e.g., signals 610 and 611) and deactivates portions of the up-converter 620. Here, circuits 651 in the up-converter are disabled (e.g., powered down) to reduce power consumption, for example. Therefore, active channels may be detected to selectively enable circuits in up-converter 620 to process digital signals only in the active channels.

FIGS. 6B-C illustrate another example of modifying an up-converter based on active channel detection. In this example, the detected active channels are used to configure a programmable logic block 630 in a programmable logic device. Referring to FIG. 6B, two (2) digital signals 610-611 corresponding to two active channels are detected. Accordingly, programmable logic block 630 is configured with a digital up-converter 631 for up-converting two digital signals 610 and 611. Alternatively, in FIG. 6C, three (3) digital signals 610-612 corresponding to three active channels are detected. Accordingly, programmable logic block 630 is configured with a digital up-converter 632 for up-converting three digital signals 610-612. Since the number of active channels shown in FIG. 6C is greater than the number of active channels in FIG. 6B, digital up-converter 632 comprises more resources on the programmable logic device than the digital up-converter 631.

In the above examples illustrating embodiments using programmable logic, the pre-distorter and up-converters are illustrated as being configured in a programmable logic block of a programmable logic device. It is to be understood that other components of the transmitter may also be included on the same programmable logic device, for example. Different implementations may incorporate different components of the transmitter in one programmable logic device or multiple programmable logic devices, for example. Additionally, according to some embodiments, configuring the programmable logic device may include partially reconfiguring the programmable logic device. In this case, a programmable logic device may be configured with a variety of communication system electronics. However, when active channels are detected, only a portion of the programmable logic device is reconfigured. This is referred to as partial reconfiguration. Further, in some embodiments, configuration or partial reconfiguration may occur dynamically based on the detected active channels. Accordingly, a communication system may be streaming information, and channels may become active or inactive during the course of operation. As channels become active or inactive during operation, the system detects the active channels as they are activated and modifies the digital processing (e.g., pre-distortion and/or up-conversion) to process the changing signals.

Figure 7:
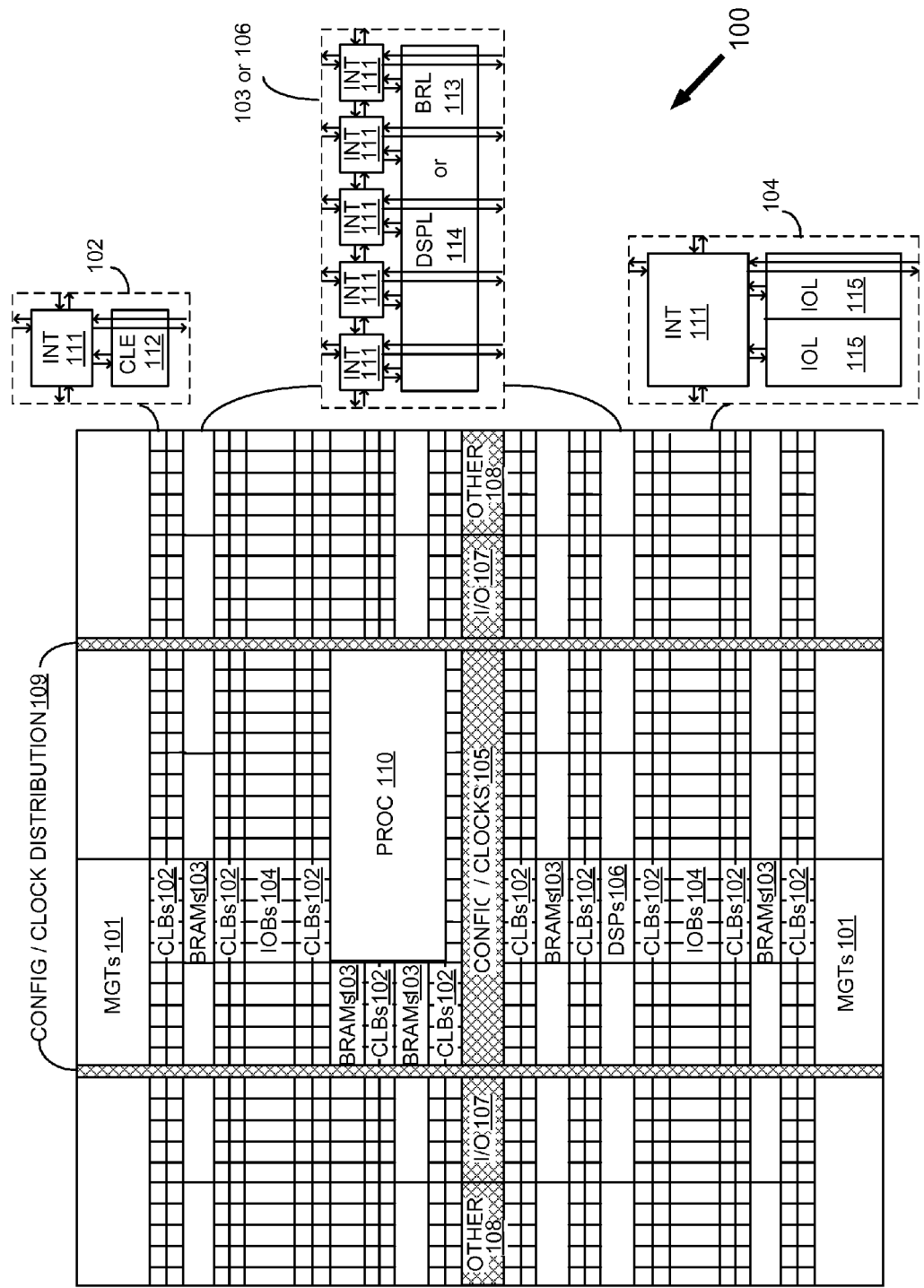
FIG. 7 is a block diagram of a programmable logic device for implementing the circuits according to an embodiment of the present invention.

FPGAs can include several different types of programmable logic blocks in an array. For example, FIG. 7 illustrates an FPGA architecture 100 that includes a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Some FPGAs also include dedicated processor blocks (PROC) 110.

In some FPGAs, each programmable tile includes a programmable interconnect element (INT) 111 having standardized connections to and from a corresponding interconnect element in each adjacent tile. Therefore, the programmable interconnect elements taken together implement the programmable interconnect structure for the illustrated FPGA. The programmable interconnect element (INT) 111 also includes the connections to and from the programmable logic element within the same tile, as shown by the examples included at the top of FIG. 7.

For example, a CLB 102 can include a configurable logic element (CLE) 112 that can be programmed to implement user logic plus a single programmable interconnect element (INT) 111. A BRAM 103 can include a BRAM logic element (BRL) 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element (DSPL) 114 in addition to an appropriate number of programmable interconnect elements. An IOB 104 can include, for example, two instances of an input/output logic element (IOL) 115 in addition to one instance of the programmable interconnect element (INT) 111. As will be clear to those of skill in the art, the actual I/O pads connected, for example, to the I/O logic element 115 typically are not confined to the area of the input/output logic element 115.

In the pictured embodiment, a columnar area near the center of the die (shown shaded in FIG. 7) is used for configuration, clock, and other control logic. Horizontal areas 109 extending from this column are used to distribute the clocks and configuration signals across the breadth of the FPGA. In other embodiments, the configuration logic may be located in different areas of the FPGA die, such as in the corners of the die.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 110 shown in FIG. 7 spans several columns of CLBs and BRAMs.

Note that FIG. 7 is intended to illustrate only an exemplary FPGA architecture. For example, the numbers of logic blocks in a column, the relative width of the columns, the number and order of columns, the types of logic blocks included in the columns, the relative sizes of the logic blocks, the locations of the logic blocks within the array, and the interconnect/logic implementations included at the top of FIG. 7 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

One or more embodiments are thought to be applicable to a variety of configurable processing functions used in communication systems. Other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method comprising:
receiving one or more digital signals, wherein each of the digital signals carry data and each of the digital signals are constrained within a first frequency range, and wherein the one or more digital signals correspond to one or more channels of a composite signal to be transmitted across a communication channel;
detecting active channels, wherein a particular active channel corresponds to the presence of a particular one of the digital signals; and
configuring a programmable device based on the detected active channels into a plurality of different configurations, wherein different configurations perform different digital processing operations on the digital signals.

2. The method of claim 1, wherein the programmable device is configured into a first configuration comprising a pre-distorter when a number of detected active channels is less than a first value, and wherein the programmable device is otherwise configured into at least one other configuration that does not include the pre-distorter.

3. The method of claim 2, further comprising:
in the first configuration,
receiving, at an input of the pre-distorter, the composite signal comprising the digital signals arranged across the first frequency range; and
pre-distorting the composite signal, wherein the pre-distorting compensates, at least in part, for distortion caused by an digital-to-analog converter to produce a pre-distorted composite signal.

4. The method of claim 3, further comprising coupling the pre-distorted composite signal to the single digital-to-analog converter.

5. The method of claim 2, wherein the programmable device is configured into the first configuration comprising the pre-distorter when the number of active channels cause an unwanted frequency component produced by a digital-to-analog converter to increase above a predetermined threshold.

6. The method of claim 1, wherein configuring the programmable device based on the detected active channels comprises:
configuring the programmable device with a first digital up-converter configuration when a first number of active channels is detected, and
configuring the programmable device with a second digital up-converter configuration when a second number of active channels is detected.

7. The method of claim 6, wherein the first number of active channels is greater than the second number of active channels, and wherein the first digital up-converter configuration comprises more resources on the programmable device than the second digital up-converter configuration.

8. The method of claim 1, wherein configuring the programmable device comprises partially reconfiguring the programmable device dynamically based on the detected active channels.

9. A method comprising:
receiving a composite signal to be transmitted across a communication channel, the composite signal comprising one or more digital signals that carry data, wherein the digital signals occupy different frequencies of the composite signal and the digital signals are each constrained within a first frequency range at the different frequencies, and wherein the one or more digital signals correspond to one or more channels of the composite signal;
detecting, using a channel detector, active channels, wherein a particular active channel corresponds to the presence of a particular one of the digital signals; and
selectively pre-distorting the composite signal based on the detected active channels, wherein pre-distorting the composite signal occurs when a number of the active channels is below a first value, and when the number of active channels is not below the first value the composite signal is not pre-distorted.

10. The method of claim 9, wherein the active channels are all below a first frequency.

11. The method of claim 9, wherein selectively pre-distorting comprises configuring a signal path in response to digital control signals, wherein the signal path comprises one of (a) routing the composite signal from an input path to an input of a pre-distorter and routing an output of the pre-distorter to an output path and (b) routing the input path around the pre-distorter to the output path.

12. The method of claim 9, wherein selectively pre-distorting comprises configuring a programmable device into a plurality of different configurations based on the detected active channels, wherein in a first configuration the programmable device pre-distorts the composite signal and in a second configuration the programmable device does not pre-distort the composite signal.

13. The method of claim 9, further comprising, after the selectively pre-distorting the composite signal, converting the composite signal from a digital signal to an analog signal.

14. The method of claim 13, wherein selectively pre-distorting comprises compensating, at least in part, for distortion caused by the act of converting the composite signal from the digital signal to the analog signal.

15. A circuit comprising:
a baseband digital circuit, the baseband digital circuit outputting one or more digital signals, wherein each of the digital signals carry data and each of the digital signals are constrained within a first frequency range, and wherein the one or more digital signals correspond to one or more channels of a composite signal to be transmitted across a communication channel;
a channel detector to detect active channels, wherein a particular active channel corresponds to the presence of a particular one of the digital signals; and
a programmable block configured based on the detected active channels, wherein the programmable block is configured into a plurality of different configurations to perform different digital processing operations on the one or more digital signals.

16. The circuit of claim 15, wherein when a number of detected active channels is less than a first value, the programmable block is configured into a first configuration comprising a pre-distorter, wherein the pre-distorter compensates, at least in part, for distortion caused by an digital-to-analog converter, and wherein the programmable block is otherwise configured into at least one other configuration that does not include the pre-distorter.

17. The circuit of claim 16, wherein when the programmable block is in the first configuration, an input of the digital-to-analog converter is coupled to an output of the pre-distorter.

18. The circuit of claim 15, wherein the programmable block further comprises:
- a first configuration when a first number of active channels is detected, the first configuration comprising a first digital up-converter to up-convert the first number of active channels, and
- a second configuration when a second number of active channels is detected, the second configuration comprising a second digital up-converter to up-convert the second number of active channels.

19. The circuit of claim 18, wherein the first number of active channels is greater than the second number of active channels, and wherein the first digital up-converter comprises more resources on the programmable block than the second digital up-converter.

20. The circuit of claim 15, wherein the programmable block is partially reconfigured dynamically based on the detected active channels.

* * * * *